(12) United States Patent
Ahrenfeldt et al.

(10) Patent No.: US 12,391,594 B2
(45) Date of Patent: Aug. 19, 2025

(54) METHOD AND SLURRY TREATMENT PLANT FOR REDUCING METHANE EMISSION FROM SLURRY PRODUCED IN A LIVESTOCK FARM

(71) Applicant: Stiesdal SkyClean A/S, Give (DK)

(72) Inventors: Jesper Ahrenfeldt, Kongens Lyngby (DK); Ulrik Birk Henriksen, Kongens Lyngby (DK); Rasmus Østergaard Gadsbøll, Kongens Lyngby (DK); Tobias Pape Thomsen, Ringsted (DK)

(73) Assignee: Stiesdal SkyClean A/S, Give (DK)

( * ) Notice: Subject to any disclaimer, the term of this patent is extended or adjusted under 35 U.S.C. 154(b) by 434 days.

(21) Appl. No.: 18/010,704

(22) PCT Filed: Jun. 23, 2021

(86) PCT No.: PCT/DK2021/050201
§ 371 (c)(1),
(2) Date: Dec. 15, 2022

(87) PCT Pub. No.: WO2021/259435
PCT Pub. Date: Dec. 30, 2021

(65) Prior Publication Data
US 2023/0234873 A1     Jul. 27, 2023

(30) Foreign Application Priority Data

Jun. 23, 2020   (EP) ..................................... 20181605

(51) Int. Cl.
*C02F 11/10*     (2006.01)
*C02F 11/13*     (2019.01)
(Continued)

(52) U.S. Cl.
CPC .............. *C02F 11/10* (2013.01); *C02F 11/13* (2019.01); *C05F 3/00* (2013.01); *C02F 2103/20* (2013.01);
(Continued)

(58) Field of Classification Search
CPC ...... C02F 11/10; C02F 11/13; C02F 2103/20; C02F 2209/02; C02F 2301/046; C02F 2303/10; C05F 3/00
See application file for complete search history.

(56) References Cited

U.S. PATENT DOCUMENTS 9,944,857 B2 *  4/2018  Dayton .................. B01J 23/002

FOREIGN PATENT DOCUMENTS

EP              3361198 A1 *  8/2018 .............. F26B 17/20
WO     WO-02079345 A1 * 10/2002 .............. A61L 11/00
(Continued)

OTHER PUBLICATIONS

International Search Report and Written Opinion for PCT/DK2021/050201 dated Sep. 1, 2021, 9 pages.

*Primary Examiner* — Youngsul Jeong
(74) *Attorney, Agent, or Firm* — Blank Rome LLP

(57)     ABSTRACT

Disclosed is a method for reducing methane emission from slurry (2) produced in a livestock farm (1). The method comprises the steps of guiding the slurry (2) from the livestock farm (1) to a dewatering unit (12) in which the slurry (2) is at least partially dewatered by extracting a watery fraction of said slurry (13), guiding the slurry from the dewatering unit (12) to a steam dryer (3), drying the slurry in the steam dryer (3), guiding the dried slurry (4) into a pyrolysis reactor (5) to produce pyrolysis gas (6) and biochar (7) through a pyrolysis process in the pyrolysis reactor (5), guiding at least a portion of the pyrolysis gas (6) to a combustion unit (8) in which the pyrolysis gas portion
(Continued)

Figure 1:
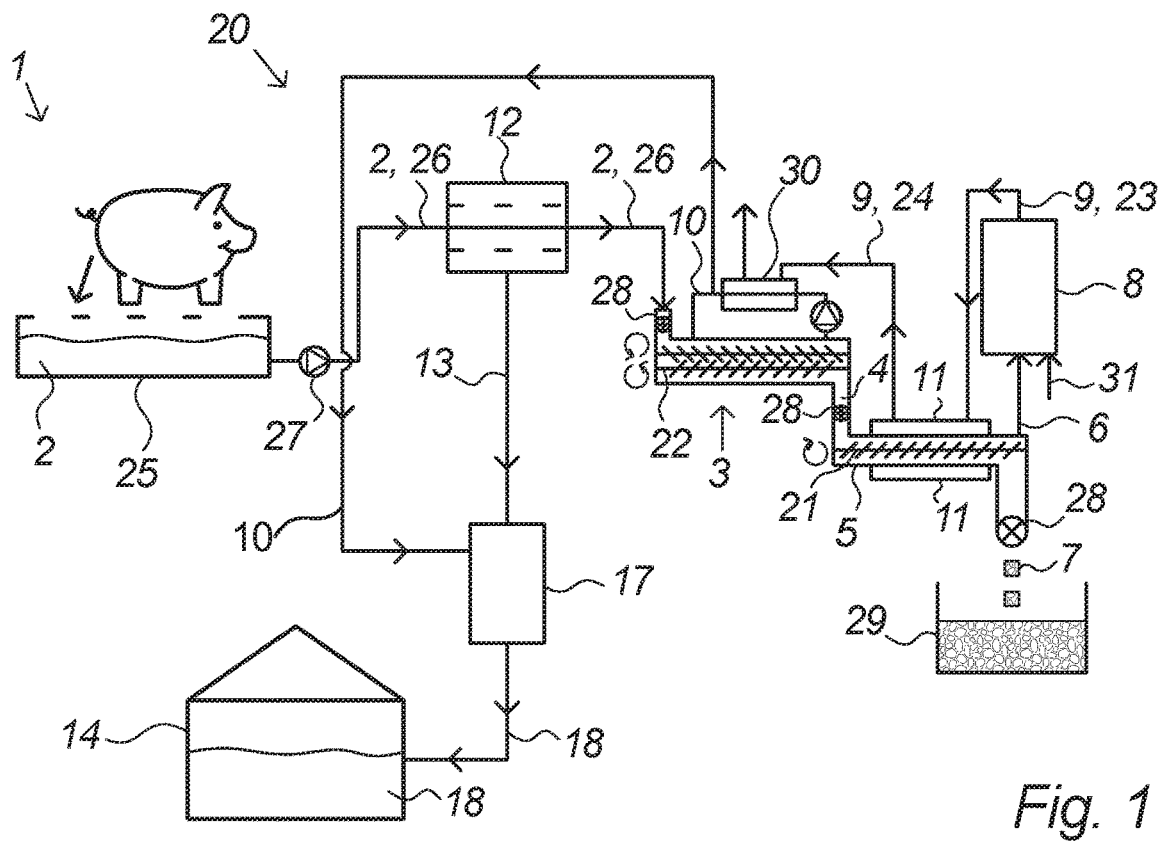

is combusted to raise the temperature of the combusted pyrolysis gas (9), guiding the combusted pyrolysis gas (9) to the pyrolysis reactor (5) to drive the pyrolysis process, guiding the combusted pyrolysis gas (9) from the pyrolysis reactor (5) to the steam dryer (3) to increase the temperature of steam (10) in the steam dryer (3), and heating the watery fraction of the slurry 13 to a temperature at least above 75° Celsius by means of the steam (10) from said steam dryer (3). Furthermore, a slurry treatment plant (20) for reducing methane emission from slurry (2) is disclosed.

20 Claims, 4 Drawing Sheets

(51) Int. Cl.
*C05F 3/00* (2006.01)
*C02F 103/20* (2006.01)

(52) U.S. Cl.
CPC .... *C02F 2209/02* (2013.01); *C02F 2301/046* (2013.01); *C02F 2303/10* (2013.01)

(56) References Cited

FOREIGN PATENT DOCUMENTS

| WO | WO-2004046279 A1 * | 6/2004 | ............. C02F 11/10 |
|----|---|---|---|
| WO | WO-2016/091169 A1 | 6/2016 | |

\* cited by examiner

METHOD AND SLURRY TREATMENT PLANT FOR REDUCING METHANE EMISSION FROM SLURRY PRODUCED IN A LIVESTOCK FARM

The present application is a national stage of International Application No. PCT/DK2021/050201, filed on Jun. 23, 2021, which claims priority to European Patent Application No. 20181605.5, filed on Jun. 23, 2020. Both of the aforementioned applications are hereby incorporated by reference in their entireties.

FIELD OF THE INVENTION

The present invention relates to a method and a slurry treatment plant for reducing methane emission from slurry.

BACKGROUND OF THE INVENTION

Methane ($CH_4$) is a significant contributor to climate change. In 2017, methane accounted for roughly 10 percent of all human-driven greenhouse gas emissions in the U.S., according to the EPA (Environmental Protection Agency). While methane is not the most abundant greenhouse gas in the atmosphere, it is among the most potent greenhouse gases, and in fact it is a more potent greenhouse gas than carbon dioxide (CO2), which is well established as having a negative influence on climate changes.

A great part of the worlds annual methane emissions come from livestock and other agricultural practices. It is found that slurry from livestock contributes significantly to emissions of methane, and thus reductions in methane emissions from livestock may prove as a viable path to combat climate changes. Methane emission from slurry is particularly a problem in agriculture where typically untreated slurry from e.g. livestock is kept for an extended amount of time, typically in silos, and subsequently spread over fields where conversion of slurry into methane occurs in the open air.

It is therefore an object of the present invention to provide for a way of reducing methane emission from slurry which at the same time is energy efficient.

THE INVENTION

The inventors have identified the above-mentioned problems and challenges related to methane emissions from slurry, and subsequently made the below-described invention which may reduce emission of methane from slurry.

The invention provides for a method for reducing methane emission from slurry produced in a livestock farm, the method comprising the steps of:
 guiding the slurry from the livestock farm to a dewatering unit in which the slurry is at least partially dewatered by extracting a watery fraction of the slurry,
 guiding the slurry from the dewatering unit to a steam dryer,
 drying the slurry in the steam dryer,
 guiding the dried slurry into a pyrolysis reactor to produce pyrolysis gas and biochar through a pyrolysis process in the pyrolysis reactor,
 guiding at least a portion of the pyrolysis gas to a combustion unit in which the pyrolysis gas portion is combusted to raise the temperature of the combusted pyrolysis gas,
 guiding the combusted pyrolysis gas to the pyrolysis reactor to drive the pyrolysis process, and
 guiding the combusted pyrolysis gas from the pyrolysis reactor to the steam dryer to increase the temperature of steam in the steam dryer, and
 heating the watery fraction of the slurry in a slurry heating system to a temperature at least above 75° Celsius by means of steam from the steam dryer.

The above method for reducing methane emission from slurry produced in a livestock farm is advantageous for several reasons. By guiding dried slurry into a pyrolysis reactor and thus subjecting the dried slurry to a pyrolysis process to produce pyrolysis gas and biochar is achieved that no biological conversion of the dried slurry occurs. The biological conversion of carbon-based compounds, promoted by otherwise present microorganisms in slurry, is the process responsible for the emission of methane from slurry, and thus by subjecting the dried slurry to a pyrolysis process in a pyrolysis reactor is achieved a reduction of methane emission from slurry.

The above method is advantageous in that it provides for an energy efficient way of reducing methane emission from slurry. The pyrolysis process produces pyrolysis gas which according to the method is combusted to raise the temperature of the pyrolysis gas. By guiding the hot combusted pyrolysis gas to the pyrolysis reactor to drive the pyrolysis process is achieved that the need of externally provided energy, such as heat energy, to the pyrolysis reactor may be reduced and thus is provided an energy efficient method of reducing methane emission from slurry.

The above method is further advantageous in that it may contribute to the removal of carbon dioxide ($CO_2$) from the atmosphere through carbon sequestration. Carbon bound in biochar is highly resilient to degradation and thus if biochar is stored in soil it may hold on to carbon for hundreds of years. Studies have shown that some fractions of biochar are stable for more than 10.000 years.

By at least partially dewatering the slurry in a dewatering unit is achieved an advantageous separation of a watery fraction of slurry from the slurry. The at least partially dewatered slurry has an increased concentration of slurry fibres which is the dry component of slurry best suited for a pyrolysis process. By decreasing the liquid content of slurry through dewatering of slurry in the dewatering unit is achieved that the efficiency of the subsequent pyrolysis process may be increased and adverse effects of water on stability, viscosity, pH, corrosiveness and other liquid properties in the pyrolysis products may be avoided.

The heating of the watery fraction of slurry to a temperature of at least above 75° Celsius is advantageous in that microorganism which may be present in the watery fraction of slurry are destroyed/killed. Microorganisms typically present in slurry, such as bacteria, contributes to methane emission through their ability of converting organic material present in slurry into methane, and therefore, by destroying/killing such microorganisms is achieved that the heat-treated watery fraction of slurry contains little to none residual microorganisms and thus the rate of conversion of organic material present in the slurry into methane is greatly reduced. By this treatment of the watery fraction of slurry is achieved a significant reduction in greenhouse gas emissions from agriculture.

Using steam from the steam dryer to heat the watery fraction of slurry to a temperature of at least above 75° Celsius is advantageous in that this heat source is readily available since excess steam is continuously produced during the drying process and a more energy efficient method and slurry treatment plant is hereby achieved.

In the context of the present invention, a "dewatering unit" should be understood as any kind of unit capable of separating a watery fraction of slurry from slurry. The dewatering unit may be a plate and frame filter press, a centrifuge, a belt filter press, or any other type of dewatering unit. The dewatering unit may comprise pumps, rotors, presses, meshes, filters or any other suitable devices for separation of a watery fraction of slurry from a slurry input.

In the context of the present invention, "slurry" should be understood as a mix made up of animal faeces and urine (it may also contain water coming from drinkers, food coming from troughs, and straw) that in a livestock farm normally accumulates under slats, i.e., in a slurry pit.

In the context of the present invention, a "steam dryer" should be understood as any kind of unit capable of drying slurry using steam. The steam dryer may comprise a slurry inlet, a slurry outlet, a steam inlet and a steam outlet. The steam dryer may further be based on a screw conveyor chamber comprising one or more screw conveyors, such as two meshing screw conveyors configured to at least partly divide the slurry while conveying the slurry from the slurry inlet to the slurry outlet.

In the context of the present invention, a "pyrolysis reactor" should be understood as any kind of reactor capable of performing a pyrolysis process, which is a thermochemical decomposition of organic material or fossil fuel at elevated temperatures, such as in the range of 200-400° Celsius in the absence of oxygen (or any halogen).

In the context of the present invention, the term "pyrolysis gas" should be understood as an at least partly combustible gas obtained from the pyrolysis process. The pyrolysis gas produced in the pyrolysis process in the pyrolysis reactor may have a temperature in excess of 500° Celsius, such as a temperature in the range from 500° Celsius to 800° Celsius, such as a temperature in the range from 600° Celsius to 700° Celsius, for example 650° Celsius.

In the context of the present invention, the term "biochar" should be understood as a solid material obtained from the pyrolysis process. Biochar is a porous material enriched in non-fossil carbon.

In an aspect of the invention, the pyrolysis reactor comprises means for transporting slurry through the pyrolysis reactor, such as a conveyor. The transporting means may comprise any kind of transporter, such as one or more screw conveyors, belt conveyor(s), drag conveyor(s) or any other type of conveyor capable of transporting slurry through a steam dryer. In an aspect of the invention, the pyrolysis reactor comprises at least one screw conveyor for transporting slurry through the pyrolysis reactor.

In an aspect of the invention, the steam dryer comprises a slurry input for feeding slurry to the steam dryer and a slurry output for outputting dried slurry.

In an aspect of the invention, the steam dryer comprises means for transporting slurry through the steam dryer from the slurry input to the slurry output. The means for transporting slurry may be a conveyor. The transporting means may comprise one or more screw conveyors, such as two screw conveyors, belt conveyor(s), drag conveyor(s) or any other type of conveyor capable of transporting slurry through a steam dryer.

In an aspect of the invention, the steam dryer comprises two meshing screw conveyors configured to at least partly divide the slurry while conveying the slurry in a transport direction from the slurry input to the slurry output.

Making the screw conveyors mesh is advantageous in that it is hereby possible to knead and divide the slurry during the conveying process and thus ensure a larger surface of the slurry to subject to heat and a better distribution of heat in the slurry which in turn all lead to a faster and more energy efficient drying process. However, it should be noted that the term "meshing" in this context include both that the conveyors actually touch, and it includes that the conveyors are almost touching—i.e. spaced at least slightly apart. In other words, the term "meshing" merely refers to the fact that the outer periphery of the helical screw blades of the conveyors are overlapping as seen in the direction of a plane perpendicular to the longitudinal direction of the screw conveyors.

In an aspect of the invention, the biochar is guided from the pyrolysis reactor to a biochar container.

In an aspect of the invention, the steam dryer comprises flow means arranged to let the steam flow past the slurry in the opposite direction of transport of slurry in the steam dryer.

Letting the steam flow in the opposite direction of the slurry is advantageous in that the driest and hottest steam thereby will contact the slurry just before it reaches the slurry outlet—thus ensuring a more efficient drying process.

In an aspect of the invention, the pyrolysis gas is mixed with air in the combustion unit.

In an aspect of the invention, the step of drying the slurry in the steam dryer is performed by guiding superheated steam substantially at atmospheric pressure past the slurry so that the superheated steam is in direct contact with at least a part of the slurry in the steam dryer.

Guiding superheated steam (at atmospheric pressure) past the slurry in the steam dryer is advantageous in that hereby a very efficient and fast heating process can be achieved. And by letting the superheated steam be in direct contact with the slurry efficient drying is ensured and when subsequently condensing the steam, the surplus heat can be reused for various steps energy requiring steps of the method. Alternatively, the surplus heat can be fed to a central heating system.

By superheated steam is understood steam at a temperature higher than its vaporization point at the absolute pressure where the temperature is measured.

In an aspect of the invention, the water content of the slurry is reduced to at least below 20 weight percentage in the steam dryer.

Reducing the water content of slurry through steam drying of slurry in the steam dryer is advantageous in that the efficiency of the subsequent pyrolysis process may be increased and adverse effects of water on stability, viscosity, pH, corrosiveness and other liquid properties in the pyrolysis products may be avoided.

According to an aspect of the invention, the water content of the slurry is reduced to at least below 15 weight percent in the steam dryer, such as reduced to a water content in the range from 1 weight percent to 10 weight percent, such as reduced to a water content in the range 5 weight percent to 10 weight percent, for example reduced to a water content of 5 weight percent.

In an aspect of the invention, the combusted pyrolysis gas is guided to a pyrolysis gas mantle enclosing at least a part of the pyrolysis reactor to provide heat to the pyrolysis process.

Guiding the combusted pyrolysis gas to a pyrolysis gas mantle enclosing at least a part of the pyrolysis reactor is advantageous in that the hot combusted pyrolysis gas may be utilized for heating the dried slurry in the pyrolysis reactor, and thereby is achieved an energy efficient way of reducing methane emission from slurry produced in a livestock farm.

In the context of the present invention, a "pyrolysis gas mantle" should be understood as any kind of mantle capable of enclosing the pyrolysis reactor, or capable of at least partially enclosing the pyrolysis reactor, and thereby deliver heat to the pyrolysis process in the pyrolysis reactor through exchange of heat from hot combusted pyrolysis gas to slurry present in the pyrolysis reactor. The pyrolysis gas mantle may comprise a pyrolysis gas mantle inlet for receiving hot combusted pyrolysis gas and a pyrolysis gas mantle exhaust for exhausting cooler combusted pyrolysis gas which have passed through the pyrolysis gas mantle and delivered heat to the pyrolysis process.

In an aspect of the invention, the slurry is dewatered to a water content of at least below 40 weight percentage in the dewatering unit.

Reducing the water content of slurry through dewatering of slurry in the dewatering unit is advantageous in that the efficiency of the subsequent pyrolysis process may be increased and adverse effects of water on stability, viscosity, pH, corrosiveness and other liquid properties in the pyrolysis products may be avoided. Reducing the water content of slurry through dewatering of slurry in the dewatering unit is further advantageous in that the efficiency of drying in the steam dryer may be increased since the water content of slurry is already reduced prior to entering the steam dryer and less energy is required for generating steam for steam drying.

According to an aspect of the invention, the slurry is dewatered to a water content in the range from 10 weight percentage to 30 weight percentage in the dewatering unit, such as to a water content of at least below 30 weight percentage, such as to a water content in the range from 15 weight percentage to 25 weight percentage, for example to a water content of 20 weight percentage.

According to an aspect of the invention, the slurry is dewatered in the dewatering unit such that the water content of the slurry is reduced by at least 70 percent, such as reduced by 70 to 85 percent, such as reduced by 75 to 80 percent, for example reduced by 80 percent.

The reduction of the water content of the slurry achieved in the dewatering unit may depend on the ash content of the slurry.

In an aspect of the invention, the watery fraction of the slurry is guided from the slurry heating system to a slurry tank for storage of the watery fraction of slurry.

Guiding the watery fraction of the slurry from the slurry heating system to a storage tank for storage is advantageous in that the watery fraction of slurry may be used for agricultural purposes such as used for spreading of slurry over fields for improving crop yields.

In the context of the present invention, a "watery fraction of slurry" should be understood a fraction of slurry having a high content of water, i.e. a water content greater than the water content of the slurry which undergoes the pyrolysis process in the pyrolysis reactor.

In the context of the present invention, a "slurry tank" should be understood as any kind of tank, reservoir, container, tank, silo, or storage unit capable of storing slurry, such as a watery fraction of slurry.

In an aspect of the invention, steam from the steam dryer is guided to a condensing device for condensation into a condensate.

Condensing steam from the steam dryer is advantageous in that steam from the steam dryer which have been used for drying the slurry may comprise ammonia ($NH_3$) which may be useful for agricultural or chemical purposes, and the resulting condensate may thus comprise ammonia in aqueous form which may be easier to handle than ammonia in gas form. Ammonia may in fact be directly applied to soil as a plant nutrient or converted into a variety of common nitrogen (N)-based fertilizers.

In the context of the present invention, a "condensing device" should be understood as any kind of device capable of condensing steam to a condensate. The condensing device may be a condenser of the surface condenser type such as a down flow surface condenser, a central flow surface condenser, or an evaporative condenser.

In an aspect of the invention, the condensate is guided to the slurry tank and fed to the watery fraction of slurry.

Guiding the condensate to the slurry tank and feeding it to the watery fraction of slurry is advantageous in that the condensate comprises ammonia which may be useful as a fertilizer and thus the fertilizing properties of the watery fraction of ammonia may be improved by addition of the condensate.

In an aspect of the invention, the watery fraction of slurry is cooled to a temperature below at least 40° Celsius after being heated in said slurry heating system (17) to a temperature at least above 75° Celsius.

Cooling the watery fraction of slurry to at least below 40° after heating is advantageous in that evaporation of ammonia from the slurry may be reduced, and the production rate of methane from the conversion of organic material present in the slurry may also be lowered further.

According to an aspect of the invention, the heating of the watery fraction in the slurry heating system to a temperature of at least above 75° Celsius and the subsequently cooling to a temperature below at least 40° Celsius is performed by the steps of:

guiding an unheated watery fraction of slurry to a slurry heat exchanger, raising the temperature of the watery fraction of slurry in the slurry heat exchanger to at least 65° Celsius, guiding the at least 65° Celsius hot watery fraction of slurry to an intermediate slurry tank, raising the temperature of the heated watery fraction of slurry to at least 75° Celsius in the intermediate slurry tank, guiding the at least 75° Celsius hot watery fraction of slurry through the slurry heat exchanger to exchange heat with the unheated watery fraction of slurry to raise the temperature of the unheated watery fraction of slurry and to cool the at least 75° Celsius hot watery fraction of slurry to at least below 40° Celsius.

The above steps of heat-treating the watery fraction of slurry is advantageous in that it provides for an energy efficient way of heating slurry produced in a livestock farm. In particular, the two-step heating process according to the above method (heating in the slurry heat exchanger followed by heating in the intermediate slurry tank) is energy efficient since the heat energy of the at least 75° Celsius hot watery fraction of slurry is transferred to the unheated watery fraction of slurry in the slurry heat exchanger thus raising the temperature of the unheated watery fraction of slurry.

In the context of the present invention, an "unheated watery fraction of slurry" should be understood as the watery fraction of slurry extracted from the dewatering unit which is guided to the slurry heating system for heating. In this sense, the unheated watery fraction of slurry may be regarded as the input to the heat treatment performed by the slurry heating system.

In the context of the present invention, a "slurry heat exchanger" should be understood as any kind of unit capable of transferring heat from a first stream of slurry to a second stream of slurry without the two streams of slurry having to mix together or come into direct contact. In the context of the present invention, an "intermediate slurry tank" should be understood as any kind of tank capable of receiving and storing heated slurry and capable of further heating the already heated slurry. The heating capability of the intermediate slurry tank may be provided for by a heating element of the intermediate slurry tank and/or by transfer of heat using a heat pump.

In an aspect of the invention, the temperature of the at least 65° Celsius hot watery fraction of slurry is raised to a temperature in the range from 70° Celsius to 100° Celsius, preferably in the range from 80° Celsius to 95° Celsius, in the intermediate slurry tank. By further raising the temperature of the at least 65° Celsius hot watery fraction of slurry to a temperature in the range from 70° Celsius to 100° Celsius, preferably in the range from 80° Celsius to 95° Celsius, is achieved an improved effectiveness in destroying/killing the microorganisms present in the watery fraction of slurry.

In an aspect of the invention, the temperature of the unheated watery fraction of slurry is raised to a temperature in the range from 65° Celsius to 80° Celsius in the slurry heat exchanger.

In an aspect of the invention, the at least below 40° Celsius cold watery fraction of slurry is guided to a slurry cooling unit wherein the temperature of the at least below 40° Celsius cold watery fraction of slurry is cooled to a temperature below at least 30° Celsius.

Cooling the at least below 40° Celsius cold watery fraction of slurry to at least below 30° Celsius is advantageous in that evaporation of ammonia from the slurry may be reduced, and the production rate of methane from the conversion of organic material present in the slurry may also be lowered further. In the context of the present invention, a "cooling unit" should be understood as any kind of unit capable of cooling slurry. The cooling unit may be an active cooling unit such as a chiller and the cooling unit may comprise a cooling circuit, a radiator, a heat exchanger, and/or any other suitable devices for actively cooling the slurry.

In an aspect of the invention, ammonia produced in the slurry heat exchanger and/or the intermediate slurry tank is collected and guided to a mixing unit in which the ammonia is dissolved in at least a portion of the at least below 40° Celsius cold watery fraction of slurry.

In an aspect of the invention, ammonia produced in the slurry heat exchanger and/or the intermediate slurry tank is collected and guided to a mixing unit in which the ammonia is dissolved in the at least below 40° Celsius cold watery fraction of slurry.

Slurry from livestock contains ammonia which is the foundation for the nitrogen fertilizer industry. Ammonia may be directly applied to soil as a plant nutrient or converted into a variety of common nitrogen fertilizers. Ammonia is well-known for having a high solubility in water—about 33 weight percentage ammonia at room temperature. Therefore, since the watery fraction of slurry contains a liquid phase (e.g. urine from livestock) ammonia may be bound in slurry. The solubility of ammonia in water is strongly affected by temperature with decreased solubility at higher temperatures. As an example, the solubility of ammonia in water is below 10 weight percent ammonia at 75° Celsius. Thus, by heating slurry produced in a livestock farm, ammonia is released from the slurry thereby depriving the slurry from its nutrient properties. For this reason, it is advantageous to collect the ammonia produced/released in the slurry heat exchanger and/or intermediate slurry tank and dissolve the collected ammonia in at least a portion of the at least below 40° Celsius cold watery fraction of slurry. By doing so, the slurry may regain its nutrient properties since the ammonia originally released from the heated slurry may bind with the slurry again at a lower temperature. In the context of the present invention, a "mixing unit" should be understood as any kind of unit capable of dissolving ammonia in slurry. The mixing unit may be a mixing tank or a mixing vessel.

In an aspect of the invention, the at least 65° Celsius hot watery fraction of slurry is guided through an auxiliary slurry heat exchanger for further heating of the hot watery fraction of slurry before the step of guiding the hot watery fraction of slurry to the intermediate slurry tank.

By guiding the at least 65° Celsius hot watery fraction of slurry through an auxiliary slurry heat exchanger for further heating of the slurry is advantageous in that an improved efficiency of the method of reducing methane emission from slurry may be achieved. A further/auxiliary slurry heat exchanger may be utilized for further heating of slurry by heat exchange with heat streams stemming from other already available sources of heat within a slurry treatment plant operating according to the method of the present invention. Thereby, the amount of heat needed to be put into the intermediate slurry tank may be reduced in order to obtain the at least 75° Celsius in the intermediate slurry tank. This is particularly advantageous if the intermediate slurry tank is powered by external power source(s), such as by a power grid, where the power needed from the external power source(s) may be reduced. In the context of the present invention, an "auxiliary slurry heat exchanger" should be understood as any kind of unit capable of transferring heat from a heat stream to a stream of slurry, e.g. watery fraction of slurry, without the two streams having to mix together or come into direct contact. The heat stream may stem from various sources of heat within a slurry treatment plant operating according to the method of the present invention. For example, the hot stream may be a stream of a hot gas (e.g. combustion gases) or a hot liquid (heated water).

In an aspect of the invention, ammonia produced in the slurry heat exchanger and/or the intermediate slurry tank is collected and guided to a combustion chamber for combustion of the ammonia, and wherein exhaust gases of the combustion is guided to the auxiliary slurry heat exchanger to exchange heat with the at least 65° Celsius hot watery fraction of slurry to raise the temperature of the at least 65° Celsius hot watery fraction of slurry.

Ammonia produced by the heating of slurry in the slurry heat exchanger and/or the intermediate slurry tank may advantageously be used to increase the temperature of the watery fraction of slurry before the slurry enters the intermediate storage tank. By combusting ammonia within a combustion chamber, a hot exhaust gas is provided which may be used in the auxiliary slurry heat exchanger as a heat stream to be used to transfer heat to the watery fraction of slurry through heat exchange. In the context of the present invention, a "combustion chamber" should be understood as any kind of furnace or chamber capable of combusting a fluid such as ammonia gas. The combustion of ammonia may according to an embodiment of the invention be accompanied by combustion of other fuels/fuel gases in the same combustion chamber.

In an aspect of the invention, the temperature of the at least 65° Celsius hot slurry is raised to at least 80° Celsius in the auxiliary slurry heat exchanger.

In an aspect of the invention, ventilation air from the livestock farm is guided to the combustion chamber and combusted together with the ammonia.

In a livestock farm, animals, such as pigs, are typically kept indoors under a roof and this may result in the air within being smelly due to the presence of ammonia and methane. In many cases, unpleasant smells from such a livestock farm may be registered not only within the livestock farm but also in the nearby surroundings of the livestock farm to the discomfort of people living by or passing by the livestock farm. To promote a good climate for livestock, the livestock farm is ventilated and thus ventilation air from a livestock farm may contain ammonia and methane. Guiding ventilation air from the livestock farm to the combustion chamber for combustion is advantageous for several reasons. Firstly, a significant reduction of smell within the livestock farm as well as its surroundings may be achieved, and secondly, the ventilation air comprising ammonia and methane which may be combusted and thereby used to provide heat to the slurry by heat exchange in the auxiliary slurry heat exchanger and thus increase the energy efficiency of the method according to the present invention. Thirdly, combustion of ammonia and methane from the ventilation air of the livestock farm may further reduce the climate footprint of agriculture.

In an aspect of the invention, one or more fuel gases are supplied to the combustion chamber for combustion of the fuel gases.

By supplying one or more fuel gases to the combustion chamber for combustion of the fuel gases may be achieved an increase in the temperature of exhaust gases produced by the combustion chamber and this may result in an increased heat transfer rate of heat from exhaust gas to the watery fraction of slurry in the auxiliary slurry heat exchanger. In the context of the present invention, "fuel gases" should be understood as any one of a number of fuels that under ordinary conditions are gaseous. The fuel gas may be composed of hydrocarbons (such as methane, biogas or propane), carbon monoxide, or mixtures thereof. Such gases are sources of potential heat energy that can be readily transmitted and distributed through pipes from the point of origin directly to the place of consumption/combustion.

In an aspect of the invention, the hot watery fraction of slurry guided to the intermediate slurry tank is kept in the intermediate slurry tank for at least 10 minutes.

The hot slurry may be kept within the intermediate slurry tank for at least 10 minutes, such as for a time duration between 15 minutes to 90 minutes. Keeping the hot slurry within the intermediate slurry tank for at least 10 minutes is advantageous in that it may be assured that most, or all, microorganisms present in the slurry are effectively destroyed/killed.

In an aspect of the invention, at least a portion of the at least below 40° Celsius cold watery fraction of slurry is guided back to the livestock farm.

In an aspect of the invention, the at least below 40° Celsius cold slurry is guided back to the livestock farm by a slurry feedback conduit. In the context of the present invention, a "slurry feedback conduit" should be understood as any kind of conduit capable of guiding slurry. The slurry feedback conduit may comprise any number of conduit elements, such as tubes, ducts, conduits, or other elements suitable for the transport of slurry along a path.

Guiding at least a portion of the at least below 40° Celsius cold watery fraction of slurry, or the at least below 30° Celsius cold watery fraction of slurry when a cooling unit is used, back to the livestock farm is advantageous in that a further reduction in methane emission may be achieved.

This feedback of treated slurry into the livestock farm may effectively work as a flushing of any piping, tubing, conduits, or gutters of the livestock farm through which untreated slurry is guided from the livestock to the slurry heat exchanger. Such a flushing may be advantageous in that slurry residues may otherwise become stuck in such piping, tubing, conduits, or gutters and thereby release methane. The at least below 40° Celsius cold watery fraction of slurry may be guided back to the livestock farm and continuously or preferably intermittently, such as at fixed time intervals for fixed time durations.

In an aspect of the invention, the portion of the at least below 40° Celsius cold watery fraction of slurry in which ammonia is dissolved is guided to an auxiliary slurry tank.

By guiding the portion of slurry in which ammonia is dissolved into an auxiliary slurry tank the cold slurry may be stored separate from the remaining portion of slurry which is guided to the slurry tank for storage. Hereby is advantageously provided for storage of two different slurry products having different nutritional properties. In the context of the present invention, an "auxiliary slurry reservoir" should be understood as any kind of tank, reservoir, container, tank, silo, or storage unit capable of storing slurry, such as a watery fraction of slurry.

The slurry heat exchanger, intermediate slurry tank, cooling unit, mixing unit, auxiliary slurry heat exchanger, combustion chamber, slurry feedback conduit, and auxiliary slurry tank may in various combinations, each combination comprising at least the slurry heat exchanger and the intermediate slurry tank, form parts of the slurry heating system.

In an aspect of the invention, the temperature of the steam is at least above 170° Celsius.

According to an aspect of the invention, the temperature of the steam is in the range from 170° Celsius to 230° Celsius, such as in the range from 180° Celsius to 220° Celsius, such as in the range from 190° Celsius to 210° Celsius, for example 200° Celsius.

When the steam is at least above 170° Celsius, or in the range from 170° Celsius to 230° Celsius, the steam, which may be referred to as superheated steam, may efficiently dry the dewatered slurry in the steam dryer.

In an aspect of the invention, the biochar is used as fertilizer.

The biochar may comprise nutrients and may thus advantageously be used as a fertilizer or in fertilizer products.

According to a preferred aspect of the invention, the biochar is mixed with a portion of the watery fraction of slurry and used as fertilizer.

By mixing the biochar with a portion of the watery fraction of slurry, such as a watery fraction of slurry which has undergone heat treatment in the slurry heating system, a fertilizer, or fertilizer product, may be obtained, and by means of the mixing of the biochar and watery fraction of slurry the NPK rating of the fertilizer (or NPK fertilizer) may advantageously be adjusted to meet desired NPK-ratings. NPK refers to nitrogen (N), phosphorus (P) and potassium (K).

Furthermore, the invention provides for a slurry treatment plant for reducing methane emission from slurry produced in a livestock farm, the slurry treatment plant comprising:
  a dewatering unit arranged to receive slurry from the livestock farm and arranged to at least partially dewater the slurry by extracting a watery fraction of the slurry,
  a steam dryer arranged to receive slurry from the dewatering unit and arranged to further reduce the water content of the received slurry by exposing the slurry to steam to produce dried slurry, a pyrolysis reactor arranged for receiving and pyrolyzing the dried slurry, wherein the pyrolysis reactor comprises transport means arranged for transporting the dried slurry through the pyrolysis reactor to transform the dried slurry into pyrolysis gas and biochar,
a combustion unit arranged for combustion of the pyrolysis gas to produce combusted pyrolysis gas,
a first pyrolysis gas conduit arranged to guide combusted pyrolysis gas to the pyrolysis reactor to drive a pyrolysis process of the pyrolysis reactor,
a second pyrolysis gas conduit arranged to guide combusted pyrolysis gas to the steam dryer to increase the temperature of steam in the steam dryer
a slurry heating system arranged to receive the watery fraction of the slurry from the dewatering unit and arranged to receive steam from the steam dryer, wherein the slurry heating system is further arranged heat the watery fraction of the slurry to a temperature at least above 75° Celsius by means of the steam from the steam dryer.

The above-described slurry treatment plant is advantageous in that it provides for an energy efficient way of treating slurry from a livestock farm such that methane emissions from the slurry may be reduced. The slurry treatment plant may advantageously be placed in close proximity to the livestock farm, preferably at the livestock farm as close as possible to the slurry-producing livestock since the conversion process of organic material present in slurry into methane occurs right from the time when slurry is produced. Thus, by placing the slurry treatment plant close to the livestock farm may be achieved a further reduction in methane emission than if the slurry treatment plant is placed far away from the livestock farm and where the slurry is transported and during which transport methane is emitted.

In the context of the present invention, a "pyrolysis gas conduit", should be understood as any kind of conduit capable of transporting pyrolysis gas along a path. The pyrolysis gas conduit, such as the first and/or second pyrolysis gas conduit, may comprise any number of conduit elements, such as tubes, ducts, conduits, or other elements suitable for the transport of slurry along a path.

As will be appreciated by the skilled person, the slurry treatment plant may comprise any number of slurry conduits to enable slurry or watery fractions of slurry to be guided between the various components, devices, units, and systems of the slurry treatment plant. In the context of the present invention, a "slurry conduit" should be understood as any kind of conduit capable of transporting slurry, or a watery fraction of slurry, along a path. A slurry conduit may comprise any number of conduit elements, such as tubes, ducts, conduits, or other elements suitable for the transport of slurry, or a watery fraction of slurry, along a path.

According to an aspect of the invention, the slurry treatment plant may comprise a slurry receiving tank.

In the context of the present invention, a "slurry receiving tank" should be understood as any kind of tank capable of receiving slurry produced by livestock from a livestock farm. The slurry receiving tank may be a dedicated tank, reservoir, or container, of the slurry treatment plant or it may be an already existing slurry tank present at the livestock farm such as a slurry tank directly present underneath the slurry-producing livestock. Alternatively, the slurry receiving tank may be an intermediate tank coupling to already existing piping, tubing, or gutters of the livestock farm.

In an aspect of the invention, the steam may be superheated steam, such as steam having a temperature of at least 170° Celsius.

In an aspect of the invention, the slurry heating system is arranged to subsequently cool the heated watery fraction of slurry to at least below 40° Celsius.

The slurry treatment plant may advantageously comprise a slurry heating system as described in relation to any of the aspects of the invention relating to the method of reducing methane emission from slurry produced in a livestock farm. By cooling the heated watery fraction of slurry to at least below 40° Celsius the emission of methane is reduced and doing it in the slurry heating system is advantageous in that the released heat hereby can be used for heating the unheated watery fraction of slurry in a simple and energy efficient way.

According to an aspect of the invention, the slurry treatment plant further comprises a slurry tank arranged for receiving the watery fraction of the slurry from the slurry heating system and storing watery fraction of the slurry.

Storing the heat-treated watery fraction of slurry in a slurry tank is advantageous in that the heat treated watery fraction of slurry hereby is ready for subsequent use—e.g. as a fertilizer.

According to an aspect of the invention, the slurry treatment plant may comprise one or more rotary valves.

According to an alternative aspect of the invention, the slurry treatment plant comprises a slurry heating system comprising a slurry boiler arranged to heat the watery fraction of slurry to at least 75° Celsius by subjecting the watery fraction of slurry to steam from the steam dryer. The watery fraction of slurry heated by the slurry boiler may subsequently be cooled in a cooling unit to a temperature of at least below 40° Celsius and next guided to a mixing unit in which ammonia released from the heating of the watery fraction of slurry is dissolved in the watery fraction of slurry. In the context of the present invention, a slurry boiler should be understood as any kind of tank, vessel or reservoir arranged to receive slurry and steam, such as superheated steam, for heating of the slurry.

According to an aspect of the invention, the slurry treatment plant is arranged to perform the method according to any of the above-described methods.

According to an aspect of the invention, the slurry treatment plant is arranged to carry out the method of reducing methane emission from slurry produced in a livestock farm according to any of the above-described aspects of the invention.

Any advantages described in relation to the method of reducing methane emission from slurry produced in a livestock farm may equally be applied to the slurry treatment plant, in the same manner as any components, devices, units, and systems, described in relation to the method may form part of the slurry treatment plant.

FIGURES

Figure 2:
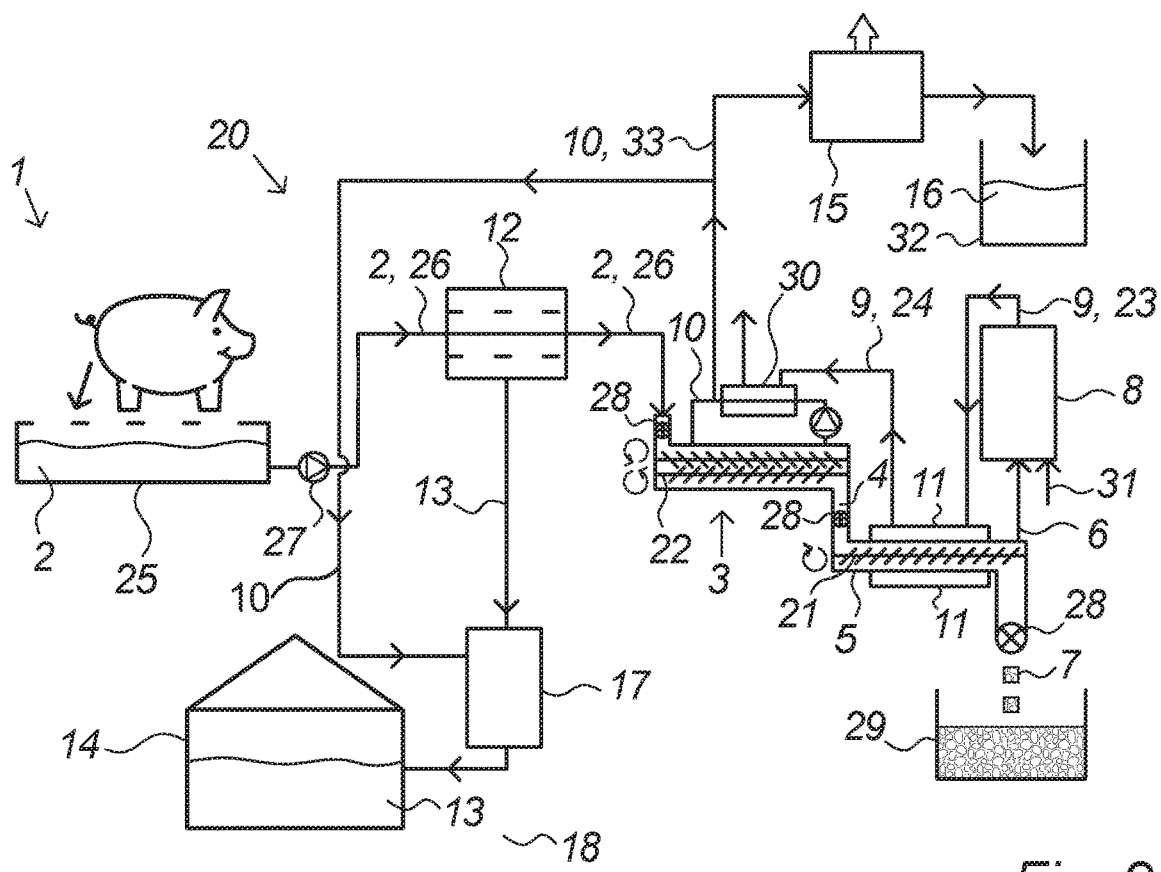
Figure 3:
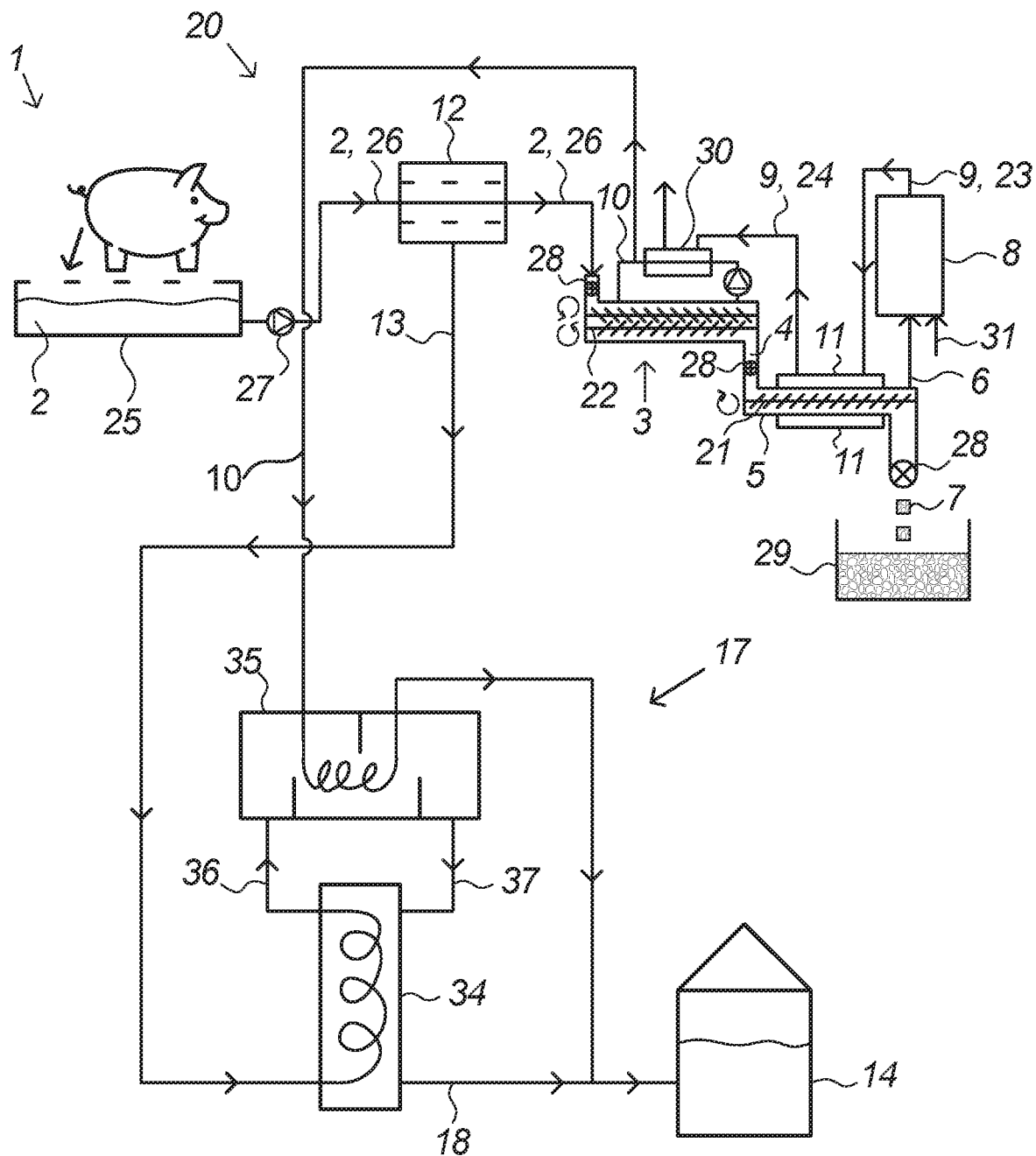
Figure 4:
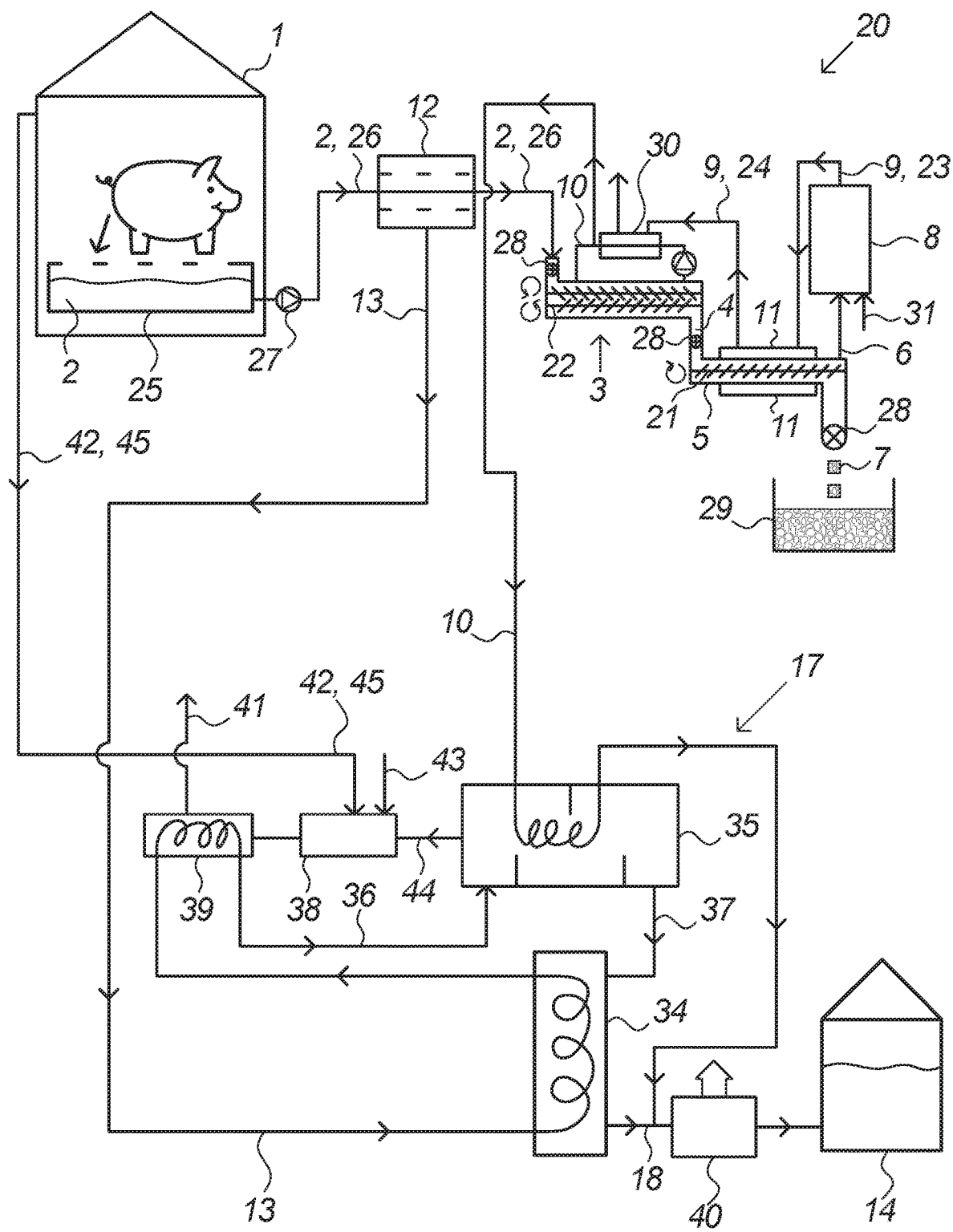
Figure 5:
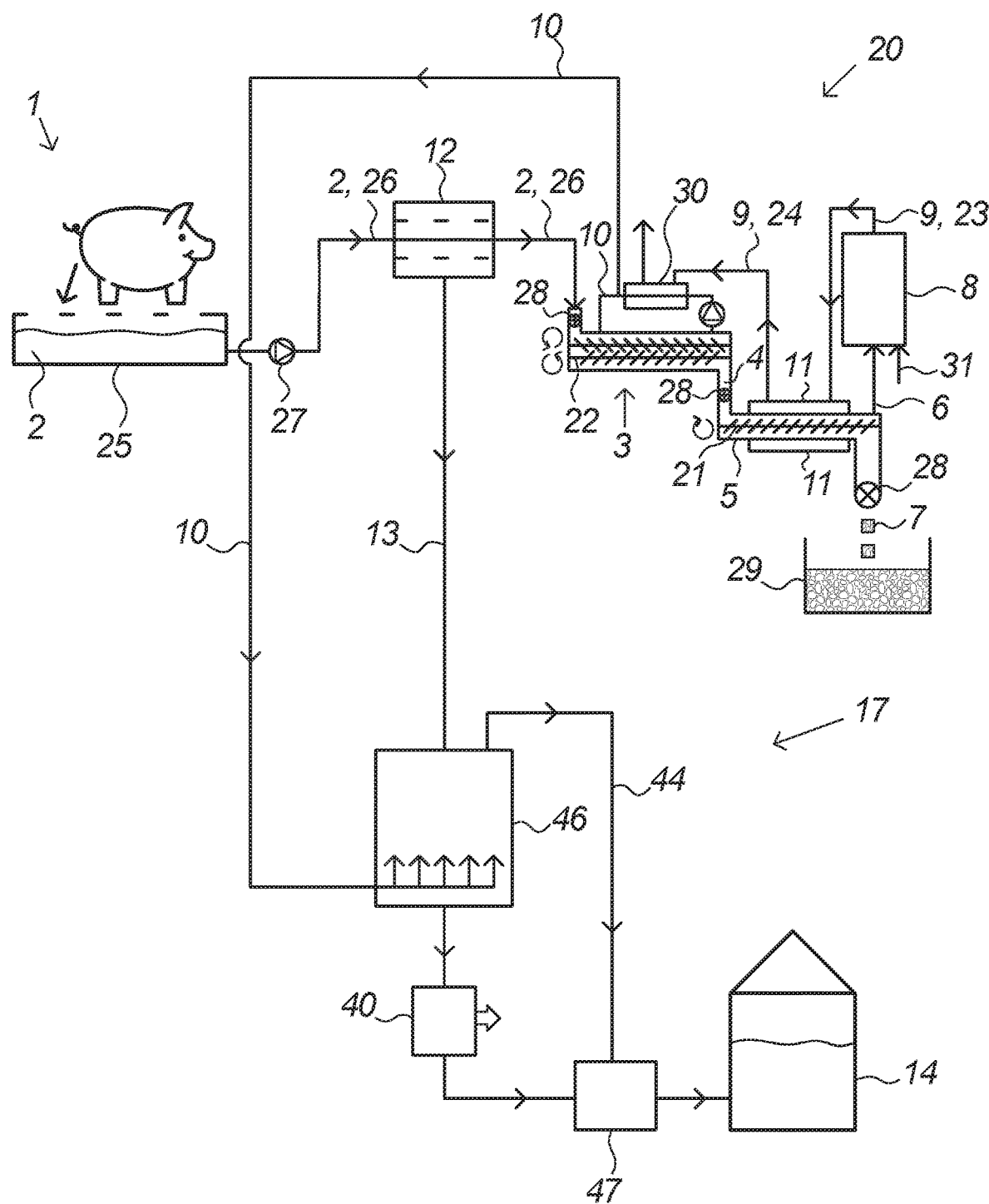

The invention will be described in the following with reference to the figures in which FIG. 1 illustrates a slurry treatment plant wherein a watery fraction of slurry is heat-treated by a slurry heating system, FIG. 2 illustrates an embodiment wherein steam is guided to a condensing device for condensation into a condensate, FIG. 3 illustrates an embodiment wherein a watery fraction of slurry is heat-treated in a slurry heating system by a slurry heat exchanger and an intermediate slurry tank, and FIG. 4 illustrates an embodiment wherein the slurry heating system comprises a combustion chamber and an auxiliary slurry heat exchanger, and FIG. 5 illustrates an alternative embodiment wherein the slurry heating system comprises a slurry boiler for heating slurry with excess steam from the steam dryer.

DETAILED DESCRIPTION

FIG. 1 illustrates a method for reducing methane emission from slurry produced in a livestock farm 1 according to an embodiment of the invention. As shown in the exemplary embodiment of FIG. 1, the method is carried out by a slurry treatment plant 20. For sake of simplicity of the drawing, the livestock farm 1 is represented as a single animal (a pig in this example), however, by a livestock farm 1 is naturally understood a farm which houses several livestock.

The livestock of the livestock farm 1 contributes, through their release of urine and faeces, to the production of slurry 2. The slurry 2 is captured in a slurry receiving tank 25 which is a reservoir/tank underneath the livestock where untreated slurry 2 from the livestock is initially received. The slurry receiving tank 25 shown in this embodiment is a reservoir which spans the entire area underneath the livestock in the livestock farm, however in other embodiments of the invention, the slurry receiving tank 25 may be a distributed receiving tank comprising one or more receiving areas which are joined together by tubing/piping to form a larger effective receiving tank. The slurry 2 is pumped through a slurry conduit 26 by a slurry pump 27 to a steam dryer 3. The slurry pump 26 of this embodiment of the invention is shown as a centrifugal pump, however, in other embodiments of the invention the slurry pump 26 may be of different pump designs such as a positive displacement pump or rotary pump. On its passage to the steam dryer 3, the slurry passes through a rotary valve 28. The rotary valve 28, which may also be referred to as a rotary airlock or as a rotary feeder, allows passage of slurry 2 into the steam dryer 3 while at the same time maintaining an airlock condition such that any steam 10 in the steam dryer 3 cannot escape through it.

The slurry 2 which has been guided into the steam dryer 3 is transported through the steam dryer by steam dryer transport means 22, which in this embodiment of the invention comprises two meshing screw conveyors, however, in other embodiments of the invention, the steam dryer transport means 22 may be any other type of conveyor such as a belt conveyor, a drag conveyor, a single screw conveyor, or any other type of conveyor capable of transporting slurry through a steam dryer 3. The slurry is subjected to steam 10 in the steam dryer, which in this embodiment of the invention is superheated steam. The superheated steam 10 is circulated through the steam dryer 3 and heat is supplied to the steam by heat transfer means 30, which in this embodiment of the invention is a heat exchanger capable of transferring heat to the steam 10 through heat exchange with a hotter gas, which in this embodiment is combusted pyrolysis gas 9.

Once transported through the steam drier 3, the slurry 2 is transformed into dried slurry 4 having a low water content, in this example between 5 and 10 weight percent water. The dried slurry 4 is guided to a pyrolysis reactor 5, which is separated from the steam dryer by a rotary valve 28 such that the superheated steam 10 in the steam dryer 3 may be separated from the pyrolysis environment in the pyrolysis reactor 5. The pyrolysis reactor 5 comprises pyrolysis reactor transport means 21 for transporting the dried slurry 4 through the pyrolysis reactor 5. In this embodiment of the invention, the pyrolysis transport means is a screw conveyor, however in other embodiments of the invention the pyrolysis reactor transport means may be a belt conveyor, a drag conveyor or any other type of conveyor capable of transporting dried slurry through a pyrolysis reactor 5.

The pyrolysis process in the pyrolysis reactor 5 produces pyrolysis gas 6 and biochar 7. The biochar 7 is guided through a rotary valve 28 and into a biochar container for storage 29. The biochar stored in the biochar container 29 may for example be used as a fertilizer and/or for carbon sequestration.

The pyrolysis gas 6 is guided through a pyrolysis gas conduit to a combustion unit 8 for combustion together with air 31. Combusted pyrolysis gas 9 produced from combustion of pyrolysis gas 6 in the combustion unit 8 is guided by a first pyrolysis gas conduit 23 into a pyrolysis gas mantle 11 which encloses a part of the pyrolysis reactor 5. The pyrolysis gas mantle 11 is arranged to contain and guide the hot combusted pyrolysis gas 9, which is at a temperature of about 700° Celsius. The pyrolysis gas mantle 11 ensures that the high temperature combusted pyrolysis gas may be used to provide heat to the pyrolysis process in the pyrolysis reactor 5.

The combusted pyrolysis gas 9 which have been used to provide heat to the pyrolysis process is still hot (several hundred degrees Celsius, e.g. 600° Celsius) is guided from the pyrolysis reactor 5 by a second pyrolysis gas conduit 24 to the steam dryer 3 where the hot combusted pyrolysis gas 30 transfers heat to the steam 10 by the heat exchanger 30 before being exhausted.

In this embodiment, the slurry 2 is first guided by a slurry conduit 26 to a dewatering unit 12 where a watery fraction of slurry 13 is separated from the slurry 2. The slurry 2 is dewatered in the dewatering unit 12 to a water content of at least below 40 weight percent water, and then the now dewatered slurry is guided to the steam dryer 3 by a slurry conduit 26.

In this embodiment the watery fraction of slurry 13 extracted/separated from the dewatering unit 12 is guided to a slurry heating system 17 of the slurry treatment plant 20. The slurry heating system 17 of the present embodiment is arranged to heat the watery fraction of slurry 13 to a temperature of at least above 75° Celsius by receiving heat energy from steam from the steam dryer 3. Thereby is achieved that microorganisms—such as bacteria—present in the watery fraction of slurry 13 are killed/destroyed which results in a further reduction in methane emissions from the slurry 2 since these microorganisms are responsible for conversion of the slurry material into methane. In this embodiment the slurry heating system 17 is in this embodiment further arranged to cool the at least above 75° Celsius heated watery fraction of slurry 13 to a temperature of at least below 40° Celsius. The at least below 40° Celsius cold watery fraction of slurry 18 is next guided from the slurry heating system 17 to a slurry tank 14 for storage. The slurry heating system 17 is described in greater details in relation to FIGS. 3-5. In another embodiment the at least above 75° Celsius heated watery fraction of slurry 13 could (also or) instead of being cooled slurry heating system 17 be guided to a cooling unit 40 (see FIG. 4) arranged for cooling the watery fraction of slurry 13 before it is guided to the a slurry tank 14.

FIG. 2 illustrates a method of reducing methane emission from slurry produced in a livestock farm 1 according to an embodiment of the invention. As shown in the exemplary embodiment of FIG. 2, the method is carried out by a slurry treatment plant 20. The embodiment of the invention as represented by FIG. 1 is like the embodiment of the invention as represented by FIG. 1, with the exception that steam 10 from the steam dryer 3 is extracted and condensed into a condensate 16.

As the steam 10, which in this embodiment of the invention is superheated steam, is passed through slurry 2 in the steam dryer 3, the steam 10 takes up ammonia which is present in the slurry 2. Therefore, by continuously or intermittently extracting steam 10 from the steam dryer 3, ammonia may be extracted from the slurry in the steam dryer 3. A portion of the extracted steam 10 is guided by a steam conduit 33 to a condensing device 15, where the steam 10 comprising ammonia is condensed to a condensate 16. Another portion of the extracted steam 10 is guided to the slurry heating system 17 to provide heat energy to heat the watery fraction of slurry 13. The condensation of the superheated steam 10 into a condensate releases heat energy (symbolized by the upright arrow at the condensing device 15 on FIG. 3) which may be used for various useful purposes such as for supplying heat energy for various heat requiring steps of the method, thereby increasing the energy efficiency of the method, or for supplying heat energy to a central heating system. According to embodiments of the invention, the excess heat energy released from the condensation of the steam 10 in the condensing device 15 may be used to provide energy to various components of the slurry treatment plant 10. Although much of the slurry treatment process of the slurry treatment plant 20 is self-powering, some energy may be needed from external sources, such as electric energy to power the pyrolysis reactor transport means 21, the steam dryer transport means 22, and the slurry pump 27. In yet another embodiment of the invention, the excess heat energy recuperated from the condensation of steam 10 may be fed to a central heating system (not shown).

The condensing device 15, or condenser, as shown in FIG. 3 condenses the steam 10 into a condensate 16, i.e. a liquid, which is collected in a condensate container 32. According to an embodiment of the invention, the condensate 16 may be used as a fertilizer, and according to yet another embodiment of the invention, the condensate 16 may be mixed with the watery fraction of slurry 13 in the slurry tank 14 and the resulting mixture may then be used as a fertilizer.

FIG. 3 illustrates a method of reducing methane emission from slurry produced in a livestock farm 1 according to an embodiment of the invention. As shown in the exemplary embodiment of FIG. 3, the method is carried out by a slurry treatment plant 20. The embodiment of the invention as represented by FIG. 3 is like the embodiment of the invention as shown in FIG. 1, with a more detailed explanation of the slurry heating system 17 of the slurry treatment plant 20.

The watery fraction of slurry 13 extracted/separated from the dewatering unit 12 is guided to a slurry heat exchanger 34 of the slurry heating system 17. The watery fraction of slurry 13 which has been guided into the slurry heat exchanger 34 is next heated by exchange of heat with already heated slurry in the slurry heat exchanger 34 to a temperature of at least 65° Celsius. The now at least above 65° Celsius hot watery fraction of slurry is guided by a first slurry heating system conduit 36 into an intermediate slurry tank 35 for further heating. The intermediate slurry tank 35, which is a tank configured for receiving and heating slurry, is used to heat the at least 65° Celsius hot watery fraction of slurry to a temperature of at least 75° Celsius. The watery fraction received in the intermediate slurry tank 35 is kept within the intermediate slurry tank 35 for at least 10 minutes, however in other embodiments of the invention the watery fraction may be kept in the intermediate slurry tank 35 for a greater time duration, and in yet other embodiments of the invention, the watery fraction may be kept in the intermediate slurry tank 35 for less than 10 minutes.

In the intermediate slurry tank 35 the watery fraction of the slurry 13 is further heated by exchanging heat with of steam from the steam dryer 3. In this process the temperature of the steam is accordingly lowered so that the steam condenses, and, in this embodiment, the condensed steam is mixed with the heat-treated watery fraction of the slurry. However, in another embodiment the steam could be guided back into the steam dryer, or it could be guided to a condensing device 15 as described in relation to FIG. 2.

Once heated in the intermediate slurry tank 35, the now at least above 75° Celsius hot watery fraction of slurry 6 is guided by a second slurry heating system conduit 37 into the slurry heat exchanger 34 where an exchange of heat (heat energy) with the unheated watery fraction of slurry 13 occurs such that the temperature of the unheated watery fraction of slurry 13 increases while the temperature of the at least 75° Celsius hot watery fraction of slurry decreases accordingly. It is understood that a reference to the at least 75° Celsius hot watery fraction of slurry is to be understood as a reference to the slurry which have passed through the intermediate slurry tank 35 and thus a heat transfer from this slurry to the unheated watery fraction of slurry 13 may also occur at temperatures below 75° Celsius.

Once the at least 75° Celsius hot watery fraction of slurry which entered the slurry heat exchanger 34 has passed through the slurry heat exchanger 34 its temperature is reduced to at least below 40° Celsius. The cooling of the slurry after its heat treatment is advantageous since then evaporation of methane and ammonia may be reduced.

The now at least below 40° Celsius cold watery fraction of slurry 18 is finally guided to a slurry tank 14 for storage. In this embodiment of the invention the slurry tank takes the form of a silo, however according to other embodiments of the invention the slurry tank 14 may take other forms such as a container, or any other kind of reservoir or storage unit configured to store slurry.

FIG. 4 illustrates a method of reducing methane emission from slurry produced in a livestock farm 1 according to yet another embodiment of the invention. As shown in the exemplary embodiment of FIG. 6 the slurry treatment plant 20 comprises a dewatering unit 12, a steam dryer 3, a pyrolysis reactor 5, a combustion unit 8 as already described in relation to the embodiments of FIGS. 1-3.

The watery fraction of slurry 13 extracted/separated from the dewatering unit 12 is guided to a slurry heat exchanger 34 where the temperature of the slurry is increased to a temperature of at least 65° Celsius. The now at least 65° Celsius hot slurry is next guided by a first slurry heating system conduit 36 to an intermediate slurry tank 35. The first slurry heating system conduit 36 of this embodiment comprises a path which runs through an auxiliary slurry heat exchanger 39. The auxiliary slurry heat exchanger 39 is arranged to further increase the temperature of the at least 65° Celsius hot slurry by exchange of heat with another heat source. After heating in the auxiliary slurry heat exchanger 39, the slurry is guided to the intermediate slurry tank 35 for further heating. The auxiliary slurry heat exchanger 39 is arranged to heat slurry by exchange of heat with exhaust gases from a combustion chamber 38.

In the intermediate slurry tank 35 the watery fraction of the slurry 13 is further heated by exchanging heat with of steam from the steam dryer 3.

The combustion chamber 38 is arranged to combust ammonia produced from the heating of slurry in the slurry heat exchanger 34 and/or the intermediate slurry tank 35. In this embodiment of the invention is shown that ammonia 44 is collected from the intermediate slurry tank 35 and guided to the combustion chamber 38 by a gas conduit. The combustion chamber 38 of the present embodiment takes as input in addition to ammonia 44 also a fuel gas 43 in the form of biogas. However, in other embodiments of the invention the fuel gas 43 may be other types of gases such as methane, propane, or other flammable gases. Furthermore, the combustion chamber 38 of the present embodiment of the invention takes ventilation air 45 from the livestock farm 1 as input. The ventilation air 45 of the livestock farm 1 is guided by a ventilation air conduit 42 to the combustion chamber 38. In this embodiment of the invention, the ventilation air conduit 42 is configured to be attached to an already existing ventilation air system of the livestock farm 1, however, in other embodiments of the invention the ventilation air conduit 42 may also comprise a collecting unit which independently of an already existing ventilation air system may collect ventilation air 45 from the livestock farm 1. By taking ventilation air 45 from the livestock farm 1 is achieved a reduction in methane emission and stink from the livestock farm 1 which may be a nuisance to people at or nearby to the livestock farm 1.

Once heated in the intermediate slurry tank 35 the slurry is guided by a second slurry heating system conduit 37 to the slurry heat exchanger 34 for exchange of heat with an unheated watery fraction of slurry 13, and thereby cooling to a temperature of at least below 40° Celsius.

The at least below 40° Celsius cold slurry 18 is guided to a cooling unit 40 for cooling of the slurry to a temperature below at least 30° Celsius. The cooling of the slurry in the cooling unit 40 releases heat energy (symbolized by the upright arrow at the cooling unit 40 on FIG. 6) which may be used for various useful purposes such as to supply heat to various energy requiring steps of the method, thereby increasing the energy efficiency of the method, or to supply heat to a central heating system. The now at least below 30° Celsius cold slurry is guided to a slurry tank 14 for storage.

Although not shown in this embodiment of the invention, ammonia 44 from the intermediate slurry tank may also be collected and guided by a gas conduit and be dissolved into at least a portion, or all, of the at least below 40° Celsius cold slurry, such as at least below 30° Celsius cold slurry in a mixing unit.

By the present embodiment of the invention which combines pyrolysis of dried slurry fibers in a pyrolysis reactor with heat-treatment of a watery fraction of the slurry is achieved a significant reduction in greenhouse gases (e.g. methane), which may be of about 50 percent (measured in $CO_2$ equivalence).

FIG. 5 illustrates a method of reducing methane emission from slurry produced in a livestock farm 1 according to an alternative embodiment of the invention. As shown in the exemplary embodiment of FIG. 5, the method is carried out by a slurry treatment plant 20. The embodiment of the invention as represented by FIG. 5 is like the embodiment of the invention as shown in FIG. 1, with a slurry heating system 17 comprising a slurry boiler 46. As shown in FIG. 5, the watery fraction of slurry 13 is guided to a slurry boiler 46 where the temperature of the slurry is raised to at least above 75° Celsius by subjecting the watery fraction of slurry 13 to excess steam 10 from the steam dryer 3. The slurry boiler 13 in this embodiment is a tank which facilitates mixing of steam, such as superheated steam, with a watery fraction of slurry 13. In this embodiment of the invention, the watery fraction of slurry 13 is heated to approximately 100° Celsius. In this way, the excess heat from the steam, released from condensation of the steam 10 in the slurry boiler, is delivered directly to the watery fraction of slurry 13 as heat energy, and any ammonia present in the steam 10 is also mixed with the watery fraction of slurry 13 in the slurry boiler. In an alternative embodiment of the invention (not shown in the drawings) the heat energy from the excess steam 10 may be transferred to the watery fraction of slurry 13 through a slurry heat exchanger—e.g. in the form of a conventional plate or tube heat exchanger. In another embodiment the heat energy from the excess steam 10 may also or instead be transferred to the watery fraction of slurry 13 by guiding the excess steam 10 through a mantle enclosing the slurry boiler 46 or a similar device holding the watery fraction of slurry 13 and/or by guiding the excess steam 10 through one or more tubes extending inside or around the slurry boiler 46 or a similar device holding the watery fraction of slurry 13.

The heated watery fraction of slurry 13 is next guided from the slurry boiler 46 to a cooling unit 40 for cooling. The cooling of the slurry in the cooling unit 40 releases heat energy (symbolized by the right-pointing arrow at the cooling unit 40 on FIG. 7) which may be used for various useful purposes such as to supply heat to various energy requiring steps of the method, thereby increasing the energy efficiency of the method, or to supply heat to a central heating system. Any ammonia 44 released from the heating of the watery fraction of slurry 13 in the slurry boiler 46 is captured and fed to the processed watery fraction of slurry 13 in a mixing unit 47. Thereby the fertilizing properties of the final slurry product stored in the slurry tank 14 is improved.

Although specific embodiments of the invention have been shown in the drawings accompanying these embodiments, various components/units shown in these specific embodiments may be combined in different configurations in other embodiments of the invention.

LIST

1 Livestock farm
2 Slurry
3 Steam dryer
4 Dried slurry
5 Pyrolysis reactor
6 Pyrolysis gas
7 Biochar
8 Combustion unit
9 Combusted pyrolysis gas
10 Steam
11 Pyrolysis gas mantle
12 Dewatering unit
13 Watery fraction of slurry
14 Slurry tank
15 Condensing device
16 Condensate
17 Slurry heating system
18 At least below 40° Celsius cold watery fraction of slurry
19 Slurry cooling unit
20 Slurry treatment plant
21 Pyrolysis reactor transport means
22 Steam dryer transport means
23, 24 First and second pyrolysis gas conduit
25 Slurry receiving tank
26 Slurry conduit
27 Slurry pump
28 Rotary valve
29 Biochar container 30 Heat transfer means
31 Air
32 Condensate container
33 Steam conduit
34 Slurry heat exchanger
35 Intermediate slurry tank
36, 37 First and second slurry heating system conduit
38 Combustion chamber
39 Auxiliary slurry heat exchanger
40 Cooling unit
41 Exhaust gas conduit
42 Ventilation air conduit
43 Fuel gas
44 Ammonia
45 Ventilation air
46 Slurry boiler
47 Mixing unit

The invention claimed is:

1. A method for reducing methane emission from slurry produced in a livestock farm, said method comprising the steps of:
providing at least partially dewatered slurry by guiding said slurry from said livestock farm to a dewatering unit in which said slurry is at least partially dewatered by extracting a watery fraction of said slurry,
guiding said at least partially dewatered slurry from said dewatering unit to a steam dryer,
providing dried slurry by drying said at least partially dewatered slurry in said steam dryer,
guiding said dried slurry into a pyrolysis reactor to produce pyrolysis gas and biochar through a pyrolysis process in said pyrolysis reactor,
guiding at least a portion of said pyrolysis gas to a combustion unit in which said at least portion of said pyrolysis gas is combusted to produce a combusted pyrolysis gas and raise the temperature of said combusted pyrolysis gas,
guiding said combusted pyrolysis gas to said pyrolysis reactor to drive said pyrolysis process,
guiding said combusted pyrolysis gas from said pyrolysis reactor to said steam dryer to increase a temperature of steam in said steam dryer, and
transporting said extracted watery fraction of said slurry to a slurry heating system and heating said extracted watery fraction of said slurry in the slurry heating system to a temperature of above 75° Celsius by means of steam from said steam dryer in the step of drying said at least partially dewatered slurry in said steam dryer.

2. The method according to claim 1, further comprising providing superheated steam, and wherein said step of drying said slurry in said steam dryer is performed by guiding the superheated steam substantially at atmospheric pressure past said slurry so that said superheated steam is in direct contact with at least a part of said slurry in said steam dryer.

3. The method according to claim 1, wherein a water content of said slurry is reduced to below 20 weight percentage in said steam dryer in the step of drying said slurry in said steam dryer.

4. The method according to claim 1, wherein a water content of said slurry is reduced to below 15 weight percentage in said steam dryer in the step of drying said slurry in said steam dryer.

5. The method according to claim 1, wherein said combusted pyrolysis gas is guided to a pyrolysis gas mantle enclosing at least a part of said pyrolysis reactor to provide heat to said pyrolysis process.

6. The method according to claim 1, wherein said slurry is dewatered to a water content of below 40 weight percentage in said dewatering unit.

7. The method according to claim 1, wherein said slurry is dewatered to a water content of below 30 weight percentage in said dewatering unit.

8. The method according to claim 1, wherein said heated watery fraction of said slurry is guided from said slurry heating system to a slurry tank for storage of said heated watery fraction of slurry.

9. The method according to claim 1, wherein a portion of the steam from said steam dryer in the step of drying said at least partially dewatered slurry in said steam dryer is guided to a condensing device for condensation into a condensate.

10. The method according to claim 9, wherein said heated watery fraction of said slurry is guided from said slurry heating system to a slurry tank for storage of said heated watery fraction of slurry and wherein said condensate is guided to said slurry tank and fed to said extracted watery fraction of slurry.

11. The method according to claim 1, wherein said watery fraction of slurry is cooled to a temperature below 40° Celsius after being heated in said heating system to a temperature above 75° Celsius.

12. The method according to claim 11, wherein said below 40° Celsius cold watery fraction of slurry is guided to a slurry cooling unit wherein the temperature of the below 40° Celsius cold watery fraction of slurry is cooled to a temperature below 30° Celsius.

13. The method according to claim 1, wherein the temperature of said steam is above 170° Celsius.

14. The method according to claim 1, wherein said biochar is used as fertilizer.

15. The method according to claim 11, wherein said heating of said watery fraction of said slurry in said slurry heating system to a temperature of above 75° Celsius and the subsequently cooling to a temperature below 40° Celsius is performed by the steps of:
guiding an unheated watery fraction of said slurry to a slurry heat exchanger,
raising the temperature of said unheated watery fraction of slurry in said slurry heat exchanger to at least 65° Celsius,
guiding said at least 65° Celsius hot watery fraction of slurry to an intermediate slurry tank,
raising the temperature of said at least 65° Celsius hot watery fraction of slurry to at least 75° Celsius in said intermediate slurry tank,
guiding said at least 75° Celsius hot watery fraction of slurry through said slurry heat exchanger to exchange heat with said unheated watery fraction of slurry to raise the temperature of said unheated watery fraction of slurry and to cool said at least 75° Celsius hot watery fraction of slurry to below 40° Celsius.

16. The method according to claim 15, wherein ammonia produced in said slurry heat exchanger and/or in said intermediate slurry tank is collected and guided to a mixing unit in which said ammonia is dissolved in at least a portion of said below 40° Celsius cold watery fraction of slurry.

17. The method according to claim 11, wherein at least a portion of said below 40° Celsius cold watery fraction of slurry is guided back to said livestock farm.

18. A slurry treatment plant for reducing methane emission from slurry produced in a livestock farm, said slurry treatment plant comprising:

a dewatering unit arranged to receive slurry from said livestock farm and arranged to at least partially dewater said slurry by extracting a watery fraction of said slurry, a steam dryer arranged to receive the at least partially dewatered slurry from said dewatering unit and arranged to reduce the water content of said received at least partially dewatered slurry further by exposing said slurry to steam to produce dried slurry, a pyrolysis reactor arranged for receiving and pyrolyzing said dried slurry, wherein said pyrolysis reactor comprises a transporter arranged for transporting said dried slurry through said pyrolysis reactor to transform said dried slurry into pyrolysis gas and biochar, a combustion unit arranged for combustion of said pyrolysis gas to produce combusted pyrolysis gas, a first pyrolysis gas conduit arranged to guide combusted pyrolysis gas to said pyrolysis reactor to drive a pyrolysis process of said pyrolysis reactor, a second pyrolysis gas conduit arranged to guide combusted pyrolysis gas to said steam dryer to increase the temperature of steam in said steam dryer a slurry heating system arranged to receive said watery fraction of said slurry from said dewatering unit and arranged to receive steam from said steam dryer, wherein said slurry heating system is further arranged to heat said watery fraction of said slurry to a temperature above 75° Celsius by means of said steam from said steam dryer.

19. The slurry treatment plant according to claim 18, wherein said slurry heating system is further arranged to subsequently cool said heated watery fraction of slurry to below 40° Celsius.

20. The slurry treatment plant according to claim 18, wherein said slurry treatment plant further comprises a slurry tank arranged for receiving said heated watery fraction of said slurry from said slurry heating system and storing said heated watery fraction of said slurry.

* * * * *